United States Patent
Gupta et al.

(10) Patent No.: US 12,347,187 B2
(45) Date of Patent: Jul. 1, 2025

(54) OBJECT DETECTION SYSTEM AND AN OBJECT DETECTION METHOD IN AQUATIC ENVIRONMENTS

(71) Applicant: Clear Robotics Limited, Central (HK)

(72) Inventors: Sidhant Gupta, Central (HK); Utkarsh Goel, Central (HK)

(73) Assignee: Clear Robotics Limited, Central (HK)

( * ) Notice: Subject to any disclaimer, the term of this patent is extended or adjusted under 35 U.S.C. 154(b) by 0 days.

(21) Appl. No.: 18/245,420

(22) PCT Filed: Dec. 15, 2022

(86) PCT No.: PCT/CN2022/139363
§ 371 (c)(1),
(2) Date: Mar. 15, 2023

(87) PCT Pub. No.: WO2024/124488
PCT Pub. Date: Jun. 20, 2024

(65) Prior Publication Data
US 2024/0290086 A1    Aug. 29, 2024

(51) Int. Cl.
*G06T 7/593* (2017.01)
*G06V 10/80* (2022.01)
(Continued)

(52) U.S. Cl.
CPC .............. *G06V 20/05* (2022.01); *G06T 7/593* (2017.01); *G06V 10/803* (2022.01); *G06V 40/10* (2022.01);
(Continued)

(58) Field of Classification Search
CPC ........ G06V 20/05; G06V 20/64; G06V 10/80; G06V 10/803; G06V 10/806;
(Continued)

(56) References Cited

U.S. PATENT DOCUMENTS

| 9,369,689 | B1 * | 6/2016 | Tran ...................... H04N 13/167 |
| 11,983,928 | B1 * | 5/2024 | Shin ........................ G06V 20/49 |
| 2021/0158556 | A1 * | 5/2021 | Wu ........................... G06T 7/73 |

OTHER PUBLICATIONS

Yin et al. "LSMD-Net: LiDAR-Stereo Fusion with Mixture Density Network for Depth Sensing" published ACCV 2022 LNCS version of the paper as available on SpringerLink: https://link.springer.com/conference/accv (Year: 2022), 17 Pages.*

* cited by examiner

*Primary Examiner* — Nathnael Aynalem
(74) *Attorney, Agent, or Firm* — Renner, Kenner, Greive, Bobak, Taylor & Weber

(57) ABSTRACT

A system and a method for an object detection system for detecting one or more objects in an aquatic environment includes a first image capture device; a second image capture device; a position scanner; a controller in electronic communication with the first image capture device, the second image capture device and the position scanner, the controller configured to receive a 2D image of a scene including the one or more objects; receive or resolve a stereo image of the scene; receive position information of the one or more objects in the scene; determine a depth data of the one or more objects in the scene based on the position information; detect one or more objects in the scene based on the 2D image, the stereo image, and the depth data of the one or more objects.

18 Claims, 5 Drawing Sheets

(51) Int. Cl.
  *G06V 10/82* (2022.01)
  *G06V 20/05* (2022.01)
  *G06V 40/10* (2022.01)
(52) U.S. Cl.
  CPC ............... *G06T 2207/10012* (2013.01); *G06T 2207/10024* (2013.01); *G06V 10/82* (2022.01)
(58) Field of Classification Search
  CPC .. G06V 10/809; G06V 20/647; G06V 20/653; G06V 40/10; G06V 40/82; G06T 2207/10028; G06T 2207/10024; G06T 2207/20081; G06T 2207/20084; G06T 2207/20076; G06T 2207/10012; G06T 3/14; G06T 7/11; G06T 7/194; G06T 7/593; G06T 7/564; G06T 7/73; G06T 7/75; G06T 7/77; G06T 7/50; G06T 7/529; G06T 7/536; G06T 7/543; H04N 13/271; H04N 2013/0081; H04N 2013/0077; H04N 2013/0074; H04N 2013/0092; H04N 13/243; H04N 13/239; H04N 13/25; H04N 13/275; H04N 13/293; H04N 2213/003; H04N 2213/001; G06N 20/00; G06N 3/08
  USPC .................................................... 348/148, 46
  See application file for complete search history.

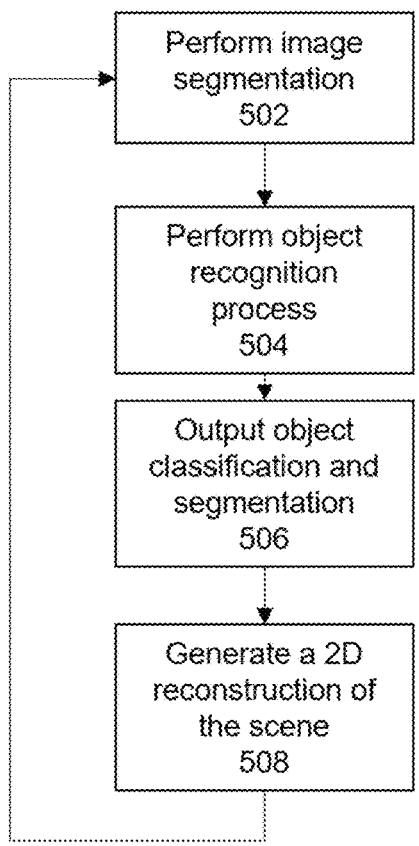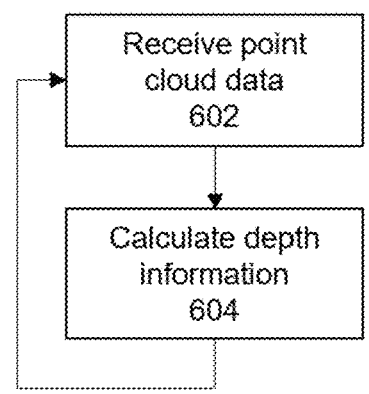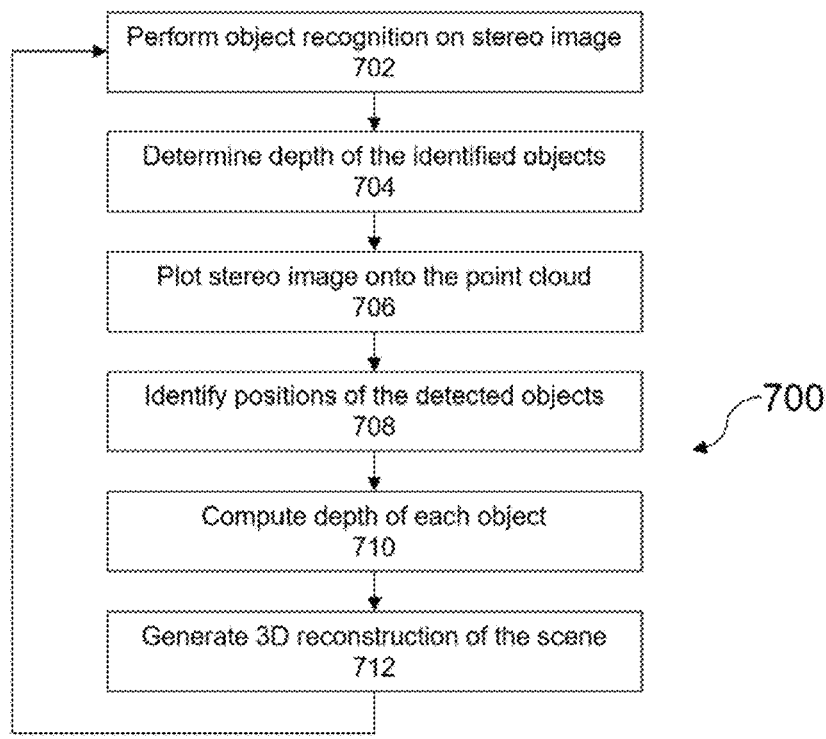
Figure 5
Figure 6
Figure 7

OBJECT DETECTION SYSTEM AND AN OBJECT DETECTION METHOD IN AQUATIC ENVIRONMENTS

TECHNICAL FIELD

The present invention relates to an object detection system and an object detection method that identifies and classifies objects. In particular, the present invention relates to an object detection system and an object detection method in or for use in aquatic environments.

BACKGROUND

Computer vision and machine learning are used in object detection solutions. Algorithms have been developed that can identify the contents of an image. Identifying contents of an image is done in two general ways: image classification and objection detection. Image classification comprises classifying an image as a whole to belong to a category or class. Objection detection is a process of identifying instances of objects in an image.

Objection detection programs are usually created using deep learning algorithms that learn to recognise certain objects by being trained on large datasets. Several datasets for recognising several commonly found objects have been published and are publicly available. Many of these datasets have been created in a diverse range of surroundings, with fairly large data variations of each object. The variations are useful in obtaining a more generalised deep learning model that can learn in a variety of scenarios.

Despite this, there are limitations to performance of a machine learning model. Such models may be limited to the data that has been used for training the model to make further classifications and predictions. Datasets have to be collected that have a general representation of real-life scenarios. It is challenging for machine learning models to operate in changing environments.

SUMMARY OF THE INVENTION

Aquatic environments are environments that change a lot. Object recognition in aquatic environments based on processing images is very challenging due to the changing nature of aquatic environments. Furthermore, there are other objects that move within aquatic environments e.g., marine life, debris etc. This can make the data quite noisy due to the movement of various objects. Object detection by processing captured images of a scene can be challenging in aquatic environments due to these reasons.

The present invention relates to an object detection system and an object detection method that identifies and classifies objects. In particular, the object detection system is useful for object detection in aquatic environments. The object detection system and object detection method utilise a combination of a 2D image, a stereo image and depth data from a position scanner for identifying and classifying objects in a scene. The object detection method and object detection system provide improved object identification and classification due to additional context from combining the 2D image, stereo image, and depth information.

The present invention relates to an object detection system and object detection method that identifies and classifies objects. In particular, the object detection system and object detection method apply sensor fusion to sensor inputs from multiple sensors. In one example objects are identified and classified (i.e., detected) by the fusion of data from a 2D image, stereo image, and depth information. Object detection is performed on the 2D image and the stereo image. Depth information is combined with the object detection output to identify and classify objects within a scene more accurately. Depth information is calculated from the stereo image and from position information from a position scanner. The depth information is combined to generate a more accurate depth of each object. The depth perception is further used to identify and classify objects in a scene more accurately.

In a first aspect of the present invention, there is provided an object detection system for detecting one or more objects in an aquatic environment, the system comprising:
 a first image capture device
 a second image capture device
 a position scanner
 a controller in electronic communication with the first image capture device, the second image capture device and the position scanner,
 the controller configured to:
 receive a 2D image of a scene including the one or more objects,
 receive or resolve a stereo image of the scene,
 receive position information of the one or more objects in the scene,
 determine a depth data of the one or more objects in the scene based on the position information,
 detect one or more objects in the scene based on the 2D image, the stereo image, and the depth data of the one or more objects.

In an embodiment of the first aspect, the controller is further configured to: identify and classify objects is based on combining the 2D image, the stereo image, and the depth data of the one or more objects to distinguish objects in a foreground from objects in the background.

In an embodiment of the first aspect, the first image detection device comprises a RGB camera, and the second image detection comprises an RGB camera or a stereo camera.

In an embodiment of the first aspect, the position scanner comprises a transmitter and receiver,
 the transmitter and receiver arranged in electrical communication with the controller,
 the controller configured to:
 control the transmitter to transmit a measurement signal at set time intervals or continuously,
 receive reflected signals from the receiver, wherein the reflected signals are representative of the position information,
 determine the depth data based on the time of flight of the reflected signal.

In an embodiment of the first aspect, the position scanner comprises a LIDAR device.

In an embodiment of the first aspect, the controller is configured to:
 align the 2D image of the scene with the stereo image the scene
 determine a distance measurement of the one or more objects in the scene based on the stereo image and the depth data of the one or more objects
 identify and classify one or more objects in the scene based on the alignment of the 2D image and the stereo image and the depth data.

In an embodiment of the first aspect, the controller is configured to:
 identify one or more objects in the 2D image by applying an object recognition process to the 2D image to generate a 2D reconstruction of the scene with one or more objects being identified within the scene.

In an embodiment of the first aspect, as part of the object detection of the 2D image, the controller is configured to: perform image segmentation to segment the 2D image outline each object identify and classify objects within the 2D image based on a classification data set, generate a 2D reconstruction of the scene with the identified and classified objects.

In an embodiment of the first aspect, the controller is configured to implement a mask R-CNN and the controller is configured to perform the object recognition process by the mask R-CNN by utilising the classification data and the controller further configured to perform image instance segmentation using the mask R-CNN.

In an embodiment of the first aspect, the object recognition process identifies the contours of the one or more objects detected in the 2D image.

In an embodiment of the first aspect, the one or more identified objects are defined by a two-dimensional coordinate and each portion of the one or more identified objects is defined by two dimensional coordinates.

In an embodiment of the first aspect, the position information comprises point cloud data that defines position of each object in a 3D dimensional coordinate system and the controller is configured to calculate depth data based on the coordinates of each object in the point cloud.

In an embodiment of the first aspect, the controller is configured to:

perform object recognition on the stereo image, determine depth of each object identified in the stereo image.

In an embodiment of the first aspect, the controller is further configured to determine the depth of each object identified in the stereo image by performing triangulation to determine the depth of each object within the stereo image.

In an embodiment of the first aspect, the controller is further configured to:

generate a 3D reconstruction of the scene based on the depth information from the position scanner and the depth from the stereo image, and the output of the object detection of the stereo image.

In an embodiment of the first aspect, the controller is configured to generate the 3D reconstruction of the scene is generated by plotting the stereo image onto the point cloud data to identify the positions of the detected objects in the stereo images in three dimensions.

In an embodiment of the first aspect, the position of each detected object or each portion of the detected object is defined by three dimensional coordinates, and the depth of each object is computed from the coordinates.

In an embodiment of the first aspect, the controller is configured to combine the 2D reconstruction and the 3D reconstruction of the scene to identify and classify objects within the scene.

In an embodiment of the first aspect, for the step of combining, the controller is configured to:

align the 2D reconstruction and the 3D reconstruction adjust the contours of the identified objects in the 2D reconstruction with the contours of the identified objects in the 3D reconstruction to rectify object identification results, wherein combining the 2D and 3D reconstructions of the scene results in an improved 3D reconstruction of the scene in which each object is more accurately identified by accounting for difference in depth.

In an embodiment of the first aspect, the controller is further configured to:

determine an outline about each object detected within the improved 3D reconstruction determine the size of each object detected within the improved 3D reconstruction.

In an embodiment of the first aspect, the outline of each object is defined by a bounding box and the controller is configured to determine the size of each object based on coordinates of the bounding box.

In accordance with a second aspect of the present invention, there is provided an object detection method for detecting one or more objects in an aquatic environment, the method comprising the steps of:

receiving a 2D image of a scene including the one or more objects, receiving or resolving a stereo image of the scene, receiving position information of the one or more objects in the scene, determining a depth data of the one or more objects in the scene based on the position information, detecting one or more objects in the scene based on the 2D image, the stereo image, and the depth data of the one or more objects.

In an embodiment of the second aspect, the step of detecting one or more objects in the scene comprises identifying and classifying objects is based on combining the 2D image, the stereo image, and the depth data of the one or more objects to distinguish objects in the foreground from objects in the background.

In an embodiment of the second aspect, the method comprises the additional steps of:

aligning the 2D image of the scene with the stereo image the scene determining a distance measurement of the one or more objects in the scene based on the stereo image and the depth data of the one or more objects identifying and classifying one or more objects in the scene based on the alignment of the 2D image and the stereo image and the depth data.

In an embodiment of the second aspect, the method the additional step of:

identifying one or more objects in the 2D image by applying an object recognition process to the 2D image to generate a 2D reconstruction of the scene with one or more objects being identified within the scene.

In an embodiment of the second aspect, the object recognition process applied to the 2D image comprises the steps of: performing image segmentation to segment the 2D image outline each object identifying and classifying objects within the 2D image based on a classification data set, outputting the object classification and segmentation generating a 2D reconstruction of the scene with the identified and classified objects.

In an embodiment of the second aspect, the object recognition process applied to the 2D image is performed by a mask R-CNN, wherein the mask R-CNN utilises the classification data set to classify objects and the mask R-CNN further performs the image instance segmentation.

In an embodiment of the second aspect, object recognition process identifies the contours of the one or more objects detected in the 2D image.

In an embodiment of the second aspect, the one or more identified objects are defined by a two-dimensional coordinates and each portion of the one or more identified objects is defined by two dimensional coordinates.

In an embodiment of the second aspect, the position information comprises point cloud data that defines position of each object in a 3D dimensional coordinate system and depth data is calculated based on the coordinates of each object as defined in the point cloud.

In an embodiment of the second aspect, the additional steps of:
  performing object recognition on the stereo image,
  determining depth of each object identified in the stereo image.

In an embodiment of the second aspect, the step of determining the depth of each object identified in the stereo image comprises applying a triangulation to determine the depth of each object within the stereo image.

In an embodiment of the second aspect, object detection of the stereo image is performed by a convolution neural network.

In an embodiment of the second aspect, the object detection method comprises the additional step of:
  generating a 3D reconstruction of the scene based on the depth information from the position scanner and the depth from the stereo image, and the object detection of the stereo image.

In an embodiment of the second aspect, the 3D reconstruction of the scene is generated by plotting the stereo image onto the point cloud data and identifying the positions of the detected objects in the stereo images in three dimensions based on plotting the stereo image onto the point cloud data.

In an embodiment of the second aspect, the position of each detected object or each portion of the detected object is defined by three dimensional coordinates, and the depth of each object is computed from the coordinates.

In an embodiment of the second aspect, the object detection method comprising the additional step of combining the 2D reconstruction and the 3D reconstruction of the scene to identify and classify objects within the scene.

In an embodiment of the second aspect, wherein the step of combining comprises the additional steps of:
  aligning the 2D reconstruction and the 3D reconstruction
  adjusting the contours of the identified objects in the 2D reconstruction with the contours of the identified objects in the 3D reconstruction to rectify object identification results,
  wherein combining the 2D and 3D reconstructions of the scene results in an improved 3D reconstruction of the scene in which each object is more accurately identified by accounting for difference in depth.

In an embodiment of the second aspect, the object detection method comprises the steps of:
  determining an outline about each object detected within the improved 3D reconstruction
  determining the size of each object detected within the improved 3D reconstruction.

In an embodiment of the second aspect, the outline of each object is defined by a bounding box and the size of each object is determined based on coordinates of the bounding box.

The term "image(s)" defines a static image of a subject captured by an image capture device e.g., a camera. The term also defines and covers a frame of a video stream of a subject captured by an image capture device e.g., a camera. A video stream comprises multiple frames, and each frame may be considered an image. The term frame and image may be used interchangeably within this specification.

The term "scene" refers to a portion of an environment. A scene refers to a portion of an environment that sensors are interacting with to sense various parameters. For example, a scene may be defined as the portion of the environment captured in an image or video stream.

BRIEF DESCRIPTION OF THE DRAWINGS

Examples of the object detection system and objection detection method will now be described, by way of example, with reference to the accompanying drawings in which:

FIG. 5 illustrates a sub routine for generating the 2D reconstruction of the scene.

FIG. 6 illustrates method for calculating depth data from the position data.

FIG. 7 illustrates an example method for generating a 3D reconstruction of a scene.

DETAILED DESCRIPTION OF THE PREFERRED EMBODIMENTS

Figure 1:
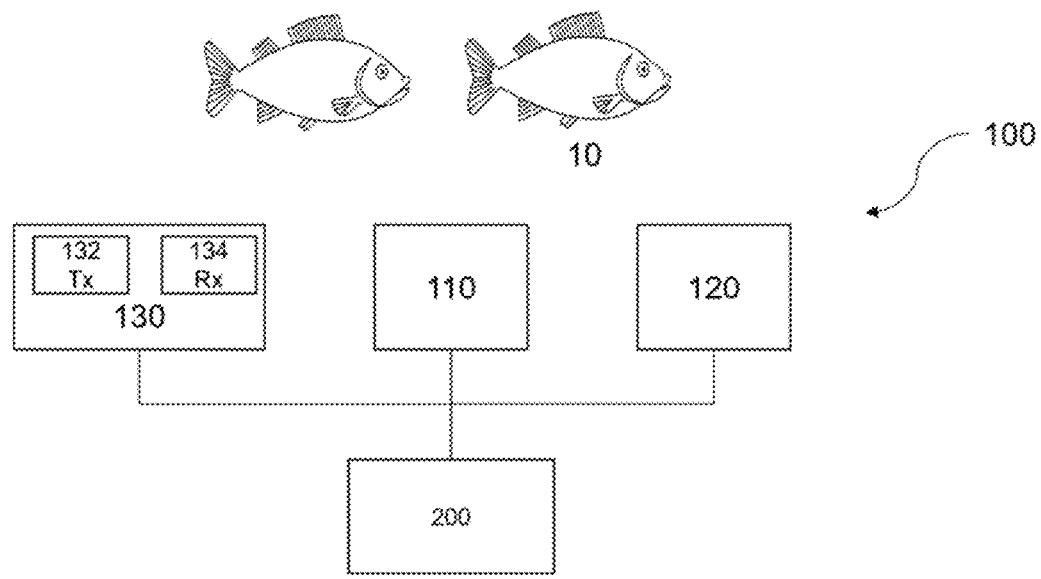
FIG. 1 illustrates an example of an object detection system.

Object recognition processes are commonly used to identify and classify objects. These object recognition processes generally utilise machine learning or deep learning algorithms. Current methods of object detection (e.g., methods to identify and classify objects in a scene) may use red; green; blue (RGB) cameras. RGB cameras are very useful for controlled environments. These systems use the camera feed to perform object detection through neural networks. The objects may also be segmented through instance segmentation processes. Changing environments are very challenging for these traditional systems that use the camera feed to perform object detection e.g., using deep neural networks. Changes in environments make large changes to the performance of object detection using RGB images. Aquatic environments are particularly challenging due to variability in the environment and due to noise in the scene.

The present invention relates to an object detection system and object detection method for use in aquatic environments. The object detection system and object detection method use a combination of multiple inputs to provide improved object identification and classification, in aquatic environments. The object detection system uses sensor fusion from multiple sensors along with performing object recognition processes i.e., machine vision to identify and classify objects in aquatic environments. The object detection system and object detection method as described herein is useful for identifying and classifying objects floating on or inside water.

The object detection system and object recognition process comprise combining a 2D image, a stereo image and depth information from a position scanner. The depth information is combined with the stereo image to construct a 3D reconstruction of a scene with spatial context. The 2D image is processed by applying an object recognition process to generate a 2D reconstruction of the scene and identify objects within the scene. The 2D reconstruction and 3D reconstruction are combined or correlated to identify and classify objects present in the scene. The 2D reconstruction and 3D reconstruction of the scene are combined to compute contours of objects in the scene. The object detection system and object detection method may further output size and weight estimations of the identified objects by applying segmentation to the identified objects.

In one example the present invention provides an object detection system for detecting one or more objects in an aquatic environment, the system comprising: a first image capture device, a second image capture device, a position scanner; a controller in electronic communication with the first image capture device, the second image capture device and the position scanner, the controller configured to: receive a 2D image of a scene including the one or more objects; receive or resolve a stereo image of the scene; receive position information of the one or more objects in the scene; determine a depth data of the one or more objects in the scene based on the position information; and detect one or more objects in the scene based on the 2D image, the stereo image and the depth data of the one or more objects. The controller may be further configured to: identify and classify objects is based on combining the 2D image, the stereo image, and the depth data of the one or more objects. The data may be combined to distinguish objects in the foreground from objects in the background.

In one example the first image capture device may be a RGB camera, and the second image capture device may be a stereo camera. The position scanner may be a LIDAR device. The controller in the object detection system may be configured to process the 2D image from the RGB camera using a convolution neural network (CNN_ to determine one or more objects within the image. The controller is configured to triangulate the position of one or more objects in a scene using the LIDAR data i.e., depth information and stereo image from the stereo camera. The controller is further configured to determine contours and/or outlines of the one or more objects within a scene. The controller of the object detection system is configured to combine the information from the object detection of the 2D image with the position information and contour and/or outline information to identify objects in the foreground and objects in the background. The depth information from the LIDAR device and depth information from the stereo image allow the controller to distinguish between foreground and background images.

The object detection system may be advantageous as it may provide a more accurate system for identifying and classifying objects in aquatic environments. The object detection system may also be advantageous as it may distinguish objects in the foreground from similar objects in the background. The object detection system further may determine the position of an identified object relative to the image detection devices and position scanner.

In one example, the present invention provides an object detection method for detecting one or more objects in an aquatic environment, the method comprising the steps of: receiving a 2D image of a scene including the one or more objects, receiving or resolving a stereo image of the scene, receiving position information of the one or more objects in the scene, determining a depth data of the one or more objects in the scene based on the position information, detecting one or more objects in the scene based on the 2D image, the stereo image and the depth data of the one or more objects. The step of detecting one or more objects in the scene comprises identifying and classifying objects is based on combining the 2D image, the stereo image, and the depth data of the one or more objects to distinguish objects in the foreground from objects in the background.

FIG. 1 illustrates an example object detection system 100. The object detection system 100 is particularly suited for detecting objects in aquatic environments, although it may also operate for semi-aquatic environments or non-aquatic environments. In the illustrated example, the object detection system 100 is used to detect fish 10, although such objects are not limited to fish, and may include any object or item such as, and without limitation, animals (marine or non-marine), vegetation, persons, man-made objects such as parts, vehicles, trash, junk, building structures, shipwrecks, artificial reefs, natural objects or items such as stones, rocks, geographic landforms, reefs, sand dunes, sand barges or other natural formations. The object detection system 100 comprises a first image capture device 110, a second image capture device 120, a position scanner 130 and a controller 200. The controller 200 is arranged in electronic communication with the first image capture device 110, second image capture device 120 and the position scanner 130. The controller 200 is configured to receive signals from each of the image capture devices 110, 120 and the position scanner 130. The controller 200 may be configured to transmit signals to the image capture device 110, 120 and the position scanner 130. The controller 200 is further configured to execute a method for object detection to identify and classify one or more objects in a scene.

The first image capture device 110 may be a 2D camera i.e., a camera that takes and generates 2D images. The first image capture device 110 may be a RGB camera that is configured to capture 2D (i.e., 2 dimensional) colour images. The camera 110 is configured to transmit captured images to the controller 200. The camera 110 may be configured to capture still images or may be configured to record a video stream of a scene.

The second image capture device 120 may be a stereo camera. The stereo camera 120 may be configured to capture a stereo image of the scene. The stereo camera 120 may be a colour camera that is configured to capture coloured stereo images. The stereo camera 120 is configured to transmit the stereo image to the controller 200. The stereo camera may capture still images or may record a video stream of the scene.

In an alternative form of the system the second image capture device 120 may be a 2D camera. In this alternate form the second image capture device 120 may be similar to the first image capture device (i.e., the first camera 110). The second image capture device 120 may capture a 2D RGB image. The second camera 120 may also be an RGB camera. The second camera 120 is configured to transmit the RGB image to the controller 200. In this alternate form the controller may receive images from the first and second image capture devices and process them to generate a stereo image. In this alternate form the first and second cameras 110, 120 may be positioned a set distance away. The set distance and the focal lengths of each camera may be utilised by the controller 200 to generate a stereo image.

The first image capture device (e.g., first camera) 110 and the second image capture device (e.g., second camera) 120 are mounted on a frame 140 and positioned a set distance apart from each other. The position scanner 130 may be mounted on the same frame 140 or may be mounted on a separate mount (not shown). The position scanner 130 may further be mounted on a moveable structure e.g., a servo-controlled mount. This allows the position scanner to move around and scan the scene.

The position scanner 130 comprises a transmitter (Tx) 132 and a receiver (Rx) 134. The position scanner 130 is configured to generate position information. The controller 200 is configured to receive position information and generate depth data (e.g., depth information) from the position information. Position information defines a point cloud. The depth data defines the depth of a detected object from the position scanner 130.

The transmitter 132 and receiver 134 are arranged in electrical communication with the controller 200. The controller 200 is configured to controller the transmitter (Tx) 132 to transmit a measurement signal. The receiver (Rx) 132 is configured to receive a reflected signal. The controller 200 is configured to control the transmitter 132 to transmit a measurement signal at set time intervals or continuously. The controller 200 is configured to receive reflected signals from the receiver 134, wherein the reflected signals are representative of the position information. The controller is programmed to determine i.e., calculate the depth data based on the time of flight of the reflected signal. The controller 200 determines the depth of an object.

In the illustrated example the position scanner is a LIDAR device (i.e., LIDAR scanner). The LIDAR scanner 130 transmits light from the transmitter 132 and receives reflected light off the object at the receiver 134. The controller 200 is programmed to calculate the depth of the object based on time of flight of the light signal. The position scanner 130 preferably generates position information for various points of the object. The controller 200 is configured to calculate the depth of various points of the object based on the reflected signal.

The position information from the position scanner 130 comprises a point cloud. The point cloud i.e., point cloud data is a 3D (three dimensional) point cloud. The point cloud e.g., point cloud data comprises multiple data points that represent the three-dimensional positions of things e.g., objects within a scene that is scanned by the LIDAR scanner 130. The point cloud data represents the various detected points of one or more objects in a scene with 3D coordinates. The controller calculates the depth of each detected point of the one or more objects in a scene using the 3D coordinates. Position information means coordinate information of multiple points of objects within a scene. Depth data defines the distance between a detected point and the position scanner. The depth is representative of the distance from the LIDAR to the detected point. The depth data provides depth perception, and the controller can distinguish objects in the foreground and objects in the background based on the depth data.

In an alternative form the position scanner may be an acoustic sensor e.g., an ultrasonic sensor or other acoustic sensor. In a further alternative the position scanner may utilise high frequency UV or other high frequency signals. In this embodiment, the controller 200 is configured to combine the 2D image, the stereo image, and the depth information to identify and classify one or more objects in a scene. The controller 200 may be configured to perform object recognition on the 2D image and the stereo image by processing the images using a convolution neural network. The controller 200 is configured to align the 2D image of the scene with the stereo image of the scene. The images may be aligned by overlaying the 2D image and the 3D image. The controller is configured to determine a distance measurement e.g., depth of one or more objects detected in the scene based on the stereo image and the depth data. The controller 200 is configured to calculate the distance of objects from the depth data and by using triangulation on the stereo image to determine depth (i.e., distance). The controller 200 is configured to identify and classify the one or more objects based on the alignment of the 2D image, stereo image, and the depth data. The distance measurement provides depth perception of objects identified in the scene. Depth perception allows for improved object detection as objects in the foreground and background.

Figure 2:
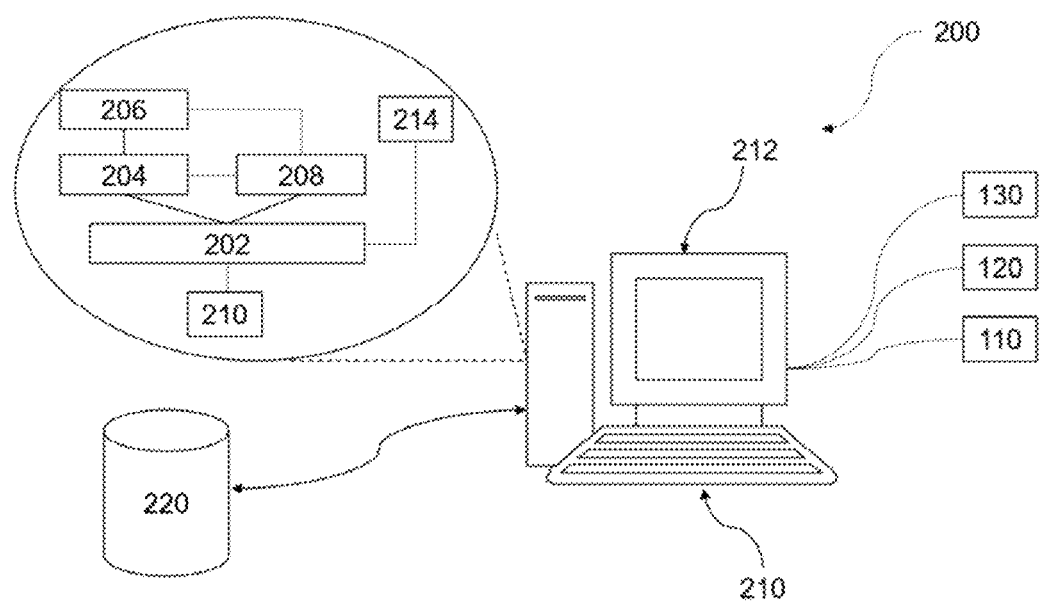
FIG. 2 illustrates a schematic diagram of the controller of the object detection system of FIG. 1.

Referring to FIG. 2, an example of the controller 200 is illustrated. The controller 200 is programmed to execute computer readable instructions stored in a non-transitory computer readable medium e.g., a memory unit. The controller is programmed to perform the steps of an object detection method. In particular the controller is programmed for: receiving a 2D image of a scene including the one or more objects, receiving or resolving a stereo image of the scene, receiving position information of the one or more objects in the scene, determining a depth data of the one or more objects in the scene based on the position information, and detecting one or more objects in the scene based on the 2D image, the stereo image and the depth data of the one or more objects.

The step of detecting one or more objects in the scene comprises identifying and classifying objects is based on combining the 2D image, the stereo image, and the depth data of the one or more objects.

The controller is programmed to perform the additional steps of aligning the 2D image of the scene with the stereo image the scene, determining a distance measurement of the one or more objects in the scene based on the stereo image and the depth data of the one or more objects and identifying and classifying one or more objects in the scene based on the alignment of the 2D image and the stereo image and the depth data.

The controller may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. In the illustrated example the controller 200 is implemented by a stand-alone computer, as shown in FIG. 2. The controller may be appropriately programmed to implement the object detection method for detecting one or more objects in aquatic environments.

In this example, the object detection system is configured to identify and classify objects in aquatic environments. The object detection system and method provide an improved way to identify and classify objects in aquatic environments. More specifically the object detection system and method allow identification and classification of objects on the water surface and/or below the water surface i.e., submerged objects. In some examples the object detection system may be used on boats or other watercraft. The object detection system may also be mounted on or implemented on stationary structures used in aquatic environments such as oil rigs or other stationary platforms. In another example the system and system components may be mounted in fish farms to detect fish in the water to count the number of fish. For example, the system may be used for management of fish or other marine life population measurement. The system may also be used for self-driving watercraft.

As shown in FIG. 2 there is a shown a schematic diagram of a computer system or computer server 200 which is arranged to be implemented as an example controller in an object detection system for detecting objects in an aquatic environment. In this example the controller 200 includes suitable components necessary to receive, store and execute appropriate computer instructions. The components may include a processing unit 202, including Central Processing Unit (CPUs), Math Co-Processing Unit (Math Processor), Graphic Processing Unit (GPUs) or Tensor Processing Unit (TPUs) for tensor or multi-dimensional array calculations or manipulation operations, read-only memory (ROM) 204, random access memory (RAM) 206, and input/output devices such as disk drives 208, input devices 210 such as an Ethernet port, a USB port, etc. Optionally the controller 200 may comprise a display 212 such as a liquid crystal display, a light emitting display or any other suitable display and communications links 214. The communications link 214 may allow wireless communications between the controller and other system components and/or other devices. The controller 200 may include instructions that may be included in ROM 204, RAM 206, or disk drives 208 and may be executed by the processing unit 202.

There may be provided a plurality of communication links 214 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link. In one example outputs of the object detection method may be transmitted by the controller to one or more computing devices via the communication link 214.

The controller 200 may include storage devices such as a disk drive 208 which may encompass solid state drives, hard disk drives, optical drives, magnetic tape drives or remote or cloud-based storage devices. The storage device i.e., memory units are non-transitory computer readable mediums. The controller 200 may use a single disk drive or multiple disk drives, or a remote storage service. The controller 200 may also have a suitable operating system 216 which resides on the disk drive or in the ROM of the controller 200.

The controller 200 e.g., the computing apparatus may also provide the necessary computational capabilities to operate or to interface with a machine learning network, such as a neural networks, to provide various functions and outputs. The neural network may be implemented locally, or it may also be accessible or partially accessible via a server or cloud-based service. The machine learning network may also be untrained, partially trained or fully trained, and/or may also be retrained, adapted, or updated over time.

The controller 200 may further comprise one or more databases to store information. In the illustrated example the controller 200 comprises at least one classification data database 220. The classification data database retains the classification data. The classification data can be training data that may be used to train neural networks to identify and classify various objects. Multiple datasets may be stored within database 220 or each dataset may be stored in its own database. The controller 200 may include multiple datasets each corresponding to a specific object and used as a training set to train neural networks to identify and classify a certain object. For example, there may be a bottle database that can be used to train a neural network to identify and classify bottles.

The controller 200 can include programming instructions for identifying and classifying one or more objects in a scene. The controller 200 may also include instructions for processing sensor inputs e.g., inputs from the image capture devices and the position scanner. The programming instructions can be stored in the memory e.g., disk drives 208 or ROM 204 of the controller 200. The programming instructions can correspond to the methods, processes and functions described herein. The programming instructions can be executed by one or more hardware processors 202 of the controller 200. The programming instructions may be implemented in C, C++, JAVA, or any other suitable programming languages. Some or all the portions of the programming instructions can be implemented in application specific circuitry such as ASICs and FPGAs.

Figure 3:
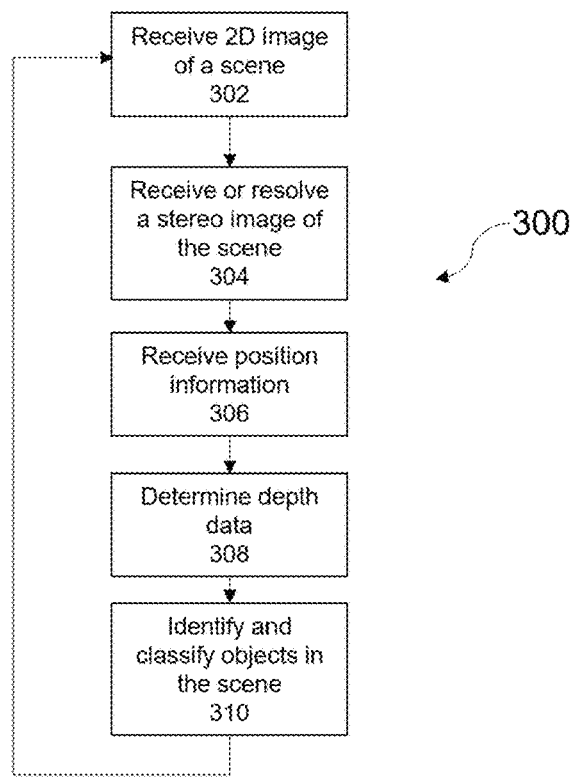
FIG. 3 illustrates an example method for object detection.

FIG. 3 illustrates an example object detection method 300 for detecting one or more objects in an aquatic environment. The method 300 is executed by the controller 200. The controller 200 is configured i.e., programmed to execute the steps of the object detection method 300. The method steps may be embodied as executable instructions and stored in a memory unit e.g., ROM 204 or a disk drive 208. The processor 202 of the controller is configured to execute the instructions and hence cause the controller 200 to perform the object detection method 300.

The object detection method 300 is initiated by a user. Step 302 comprises receiving a 2D image of a scene including the one or more objects. Step 304 comprises receiving or resolving a stereo image of the scene. Step 306 comprises receiving position information of the one or more objects in the scene. Step 308 comprises determining a depth data of the one or more objects in the scene based on the position information. Step 310 comprises detecting one or more objects in the scene based on the 2D image, the stereo image, and the depth data of the one or more objects. Step 310 further comprises identifying and classifying objects is based on combining the 2D image, the stereo image, and the depth data of the one or more objects.

At step 304 the method may comprise receiving a stereo image from a stereo camera or may comprise resolving a stereo image from two images received from two RGB cameras.

The object detection method 300 is preferably repeated continuously to identify and classify multiple objects that may be present in a scene. As shown in FIG. 3 steps 302, 304, 306 may be executed concurrently e.g., in parallel. Steps 306 and 308 may be performed sequentially.

Figure 4:
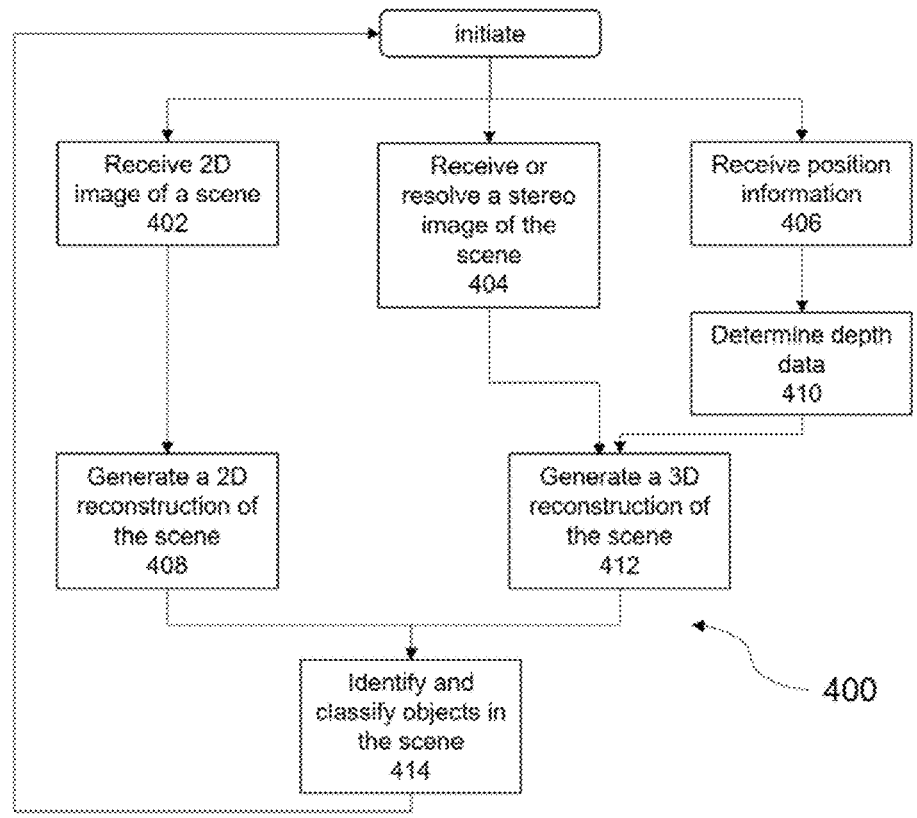
FIG. 4 illustrates an example method for object detection.

FIG. 4 illustrates another example object detection method 400 for detecting one or more objects in an aquatic environment. The method 400 is executed by the controller 200. The method 400 may be embodied as computer readable and executable instructions that are stored in a memory unit e.g., ROM 204 or a disk drive 208. The object detection method 400 is used for identifying and classifying one or more objects in a scene.

Referring to FIG. 4, step 402 comprises receiving an image from a first image capture device 120. The first image may be a 2D image. Step 404 comprises receiving or resolving a stereo image. The stereo image may be received from a second image capture device 130 that may be a stereo camera, or the stereo image may be resolved from two images received from the first image capture device 120 and second image capture device 130, wherein the first and second image capture devices 120, 130 may be 2D cameras.

Step 406 comprises receiving position data from the position scanner. Steps 402 to 406 may all occur in parallel.

Step 408 comprises generating a 2D reconstruction of the scene by processing the 2D image. Step 410 comprises determining depth data from the position information received at step 406. Step 412 comprises generating a 3D (three dimensional) reconstruction of the scene. The 3D reconstruction of the scene may be generated by processing the stereo image and using the depth data. Step 414 comprises identifying and classifying one or more objects in the scene using the 2D reconstruction and 3D reconstruction. The 2D reconstruction and 3D reconstructions are combined to identify and classify one or more objects within the scene. The identification and classification of objects applies statistical methods to estimate error. High error values may be deleted. Statistical methods are used to verify if the identification and classification of objects are high confidence.

FIG. 5 illustrates further steps for generating the 2D reconstruction of the scene at step 408. FIG. 5 illustrates the 2D reconstruction sub-routine 500. The sub-routine 500 is executed by the controller 200. The sub-routine 500 comprises step 502. Step 502 comprises performing image segmentation to segment the 2D image outline each object within the image. Image segmentation may comprise segmenting images by lines around each object.

Step 504 comprises performing an object recognition process. Step 504 comprises identifying and classifying objects within the 2D image based on a classification data set. At step 504 the 2D image is processed by an object recognition process. The object recognition process may be implemented by a convolution neural network. The convolution neural network may be trained with classification data that is utilized to identify and classify and objects. In one example the convolution neural network may be a mask R convolution neural network (Mask R-CNN). The mask R-CNN also performs the image instance segmentation.

Step 506 comprises outputting the object classification and segmentation. Step 508 comprises generating a 2D reconstruction of the scene with the identified and classified objects. The 2D reconstruction of the scene recognizes and pinpoints the objects within the image. The objects may be presented within bounding boxes.

The object recognition process performed by the mask R-CNN identifies the contours of the one or more objects detected in the 2D image. The 2D reconstruction includes the contours of the objects recognized and classified by the object recognition process. The one or more identified objects are defined by a two-dimensional coordinates and each portion of the one or more identified objects is defined by two dimensional coordinates. The 2D reconstruction may include the coordinates that define the position of the objects within the scene. Optionally the 2D reconstruction may be displayed on a display of the controller. The 2D reconstruction as outputted by the 2D reconstruction sub-routine 500 are used in the object detection method 400.

Referring to FIG. 6, there is displayed a flow chart for an example method for calculating depth data 600 from the position data. The controller 200 is configured to execute the method 600. Method 600 may be a sub-routine of step 410.

The method for calculating depth data 600 commences at step 602 after position information is received. The position information may be in the form of a point cloud e.g., point cloud data. Step 602 comprises receiving the point cloud data. The point cloud data that defines position of each object in a 3D dimensional coordinate system. Step 602 comprises determining the position of each part of the object or the object based on the point cloud data.

Step 604 comprises calculating depth information based on the coordinates in the point cloud. In one example the dept is calculated by using the coordinates along one axis e.g., the y axis which may define the distance away from the position scanner. The depth is calculated by subtracting the y position from a reference point. The calculated depth is used in method 400.

FIG. 7 illustrates an example of a method for generating a 3D reconstruction of a scene 700. FIG. 7 shows additional steps that are implemented in generating a 3D reconstruction of a scene. Sub-routine 700 comprises step 702. Step 702 comprises performing object recognition on the stereo image. The object recognition may be performed by a convolution neural network. In one example the object recognition is performed by a mask R convolution neural network (Mask R-CNN). The mask R-CNN may use classification data to identify one or more objects. The classification data may be a training data set used to train the neural network.

Step 704 comprises determining depth of the one or more identified objects in the stereo image. Step 704 comprises applying a triangulation method to determine the depth of each object within the stereo image. Triangulation is performed on the two sub images of the stereo image. Triangulation provides an indication of the depth e.g., distance from the image capture devices.

Step 706 comprises plotting the stereo image onto the point cloud data. Step 706 comprises combining the stereo image and the point cloud data from the position scanner.

Step 708 comprises identifying the positions of the detected objects in the stereo images in three dimensions based on plotting the stereo image onto the point cloud data. The position of each detected object or each portion of the detected object is defined by three dimensional coordinates, Step 710 comprises computing the depth of each object is computed from the coordinates. The controller 200 is configured to calculate the depth of the identified objects from the coordinate information. The controller 200 may also calculate the depth of each portion of an object identified in the stereo image. For example, the coordinates of the head and tail of a fish can be used to determine depth to the fish. Further the controller 200 may further determine other measurements of identified objects e.g., length or width of the objects. These measurements are calculated using coordinates. Combining the point cloud data and the stereo image help to reduce noise and provide an improve depth measurement.

Step 712 comprises generating a 3D (three dimensional) reconstruction of the scene. The controller 200 is configured to generate a 3D reconstruction of the scene based on the depth information from the position scanner and the depth from the stereo image, and the object detection of the stereo image. The 3D reconstruction is outputted and used in step 412. The 3D reconstruction using the stereo image and the point cloud is advantageous as it provides more accurate contours around the objects identified in the scene. The fusion of the depth information and stereo image provides additional context to the scene which provides more accurate contours around objects.

Figure 8:
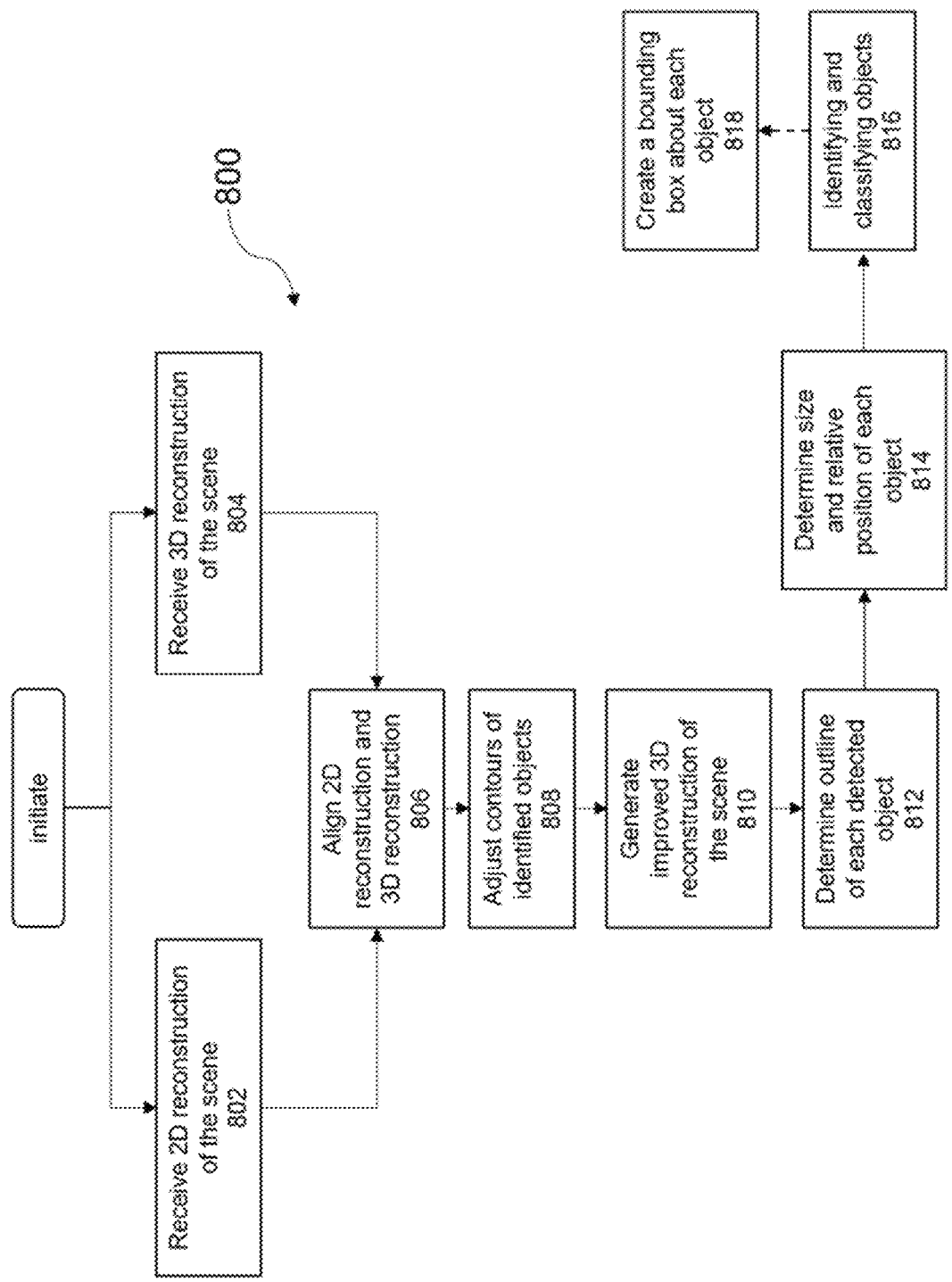
FIG. 8 an example method for identifying and classifying objects based on the 2D image, the stereo image, and the depth data.

FIG. 8 illustrates an example method for identifying and classifying objects 800 based on the 2D image, the stereo image, and the depth data. The method 800 is a sub routine or sub method for step 414. The controller is configured to execute the method of identifying and classifying an object in a scene 800. The method 800 may be utilized by the controller to identify and classify multiple objects in a scene.

Referring to FIG. 8, step 802 comprises receiving a 2D reconstruction of the scene. The 2D reconstruction comprises outlines e.g., contours of objects identified within the 2D image. Step 804 comprises receiving a 3D reconstruction of the scene. The 3D reconstruction is generated by 700.

Step 806 comprises aligning the 2D reconstruction of the scene and the 3D reconstruction of the scene. Aligning may comprise overlaying the 2D reconstruction onto the 3D reconstruction. Step 808 comprises adjusting the contours of the identified objects in the 2D reconstruction with the contours of the identified objects in the 3D reconstruction to rectify object identification results. This is advantageous as the position of the objects identified in the 2D reconstruction are corrected based on the depth perception provided by the 3D reconstruction. The 3D reconstruction distinguishes objects in the foreground and objects in the background. This distinguishing is possible due to the depth information which provides depth perception.

Step 810 comprises generating an improved 3D reconstruction of the scene where each object is more accurately identified by accounting for difference in depth. The difference in depth is determined from the depth perception in the 3D reconstruction. This depth perception provides more accurate positioning of objects and allows for more accurate identification and classification of objects. For example, a single fish in a school of fish can be identified due to the depth information that allows differentiation of foreground objects as compared to background objects. This provides more accurate object identification as compared to object identification in 2D images. The depth perception is improved as it is based on the combination of LIDAR position information and triangulate depth calculated from stereo images. Step 812 comprises determining the outline of each detected object. Step 814 comprises determining the size and relative position of each object within a scene. Step 816 comprises identifying and classifying objects based on the size and relative position of each identified object. Optionally the method may comprise the step 818 of creating a bounding box about each identified object. The outline of each object is defined by a bounding box and the size of each object is determined based on coordinates of the bounding box.

Figure 9:
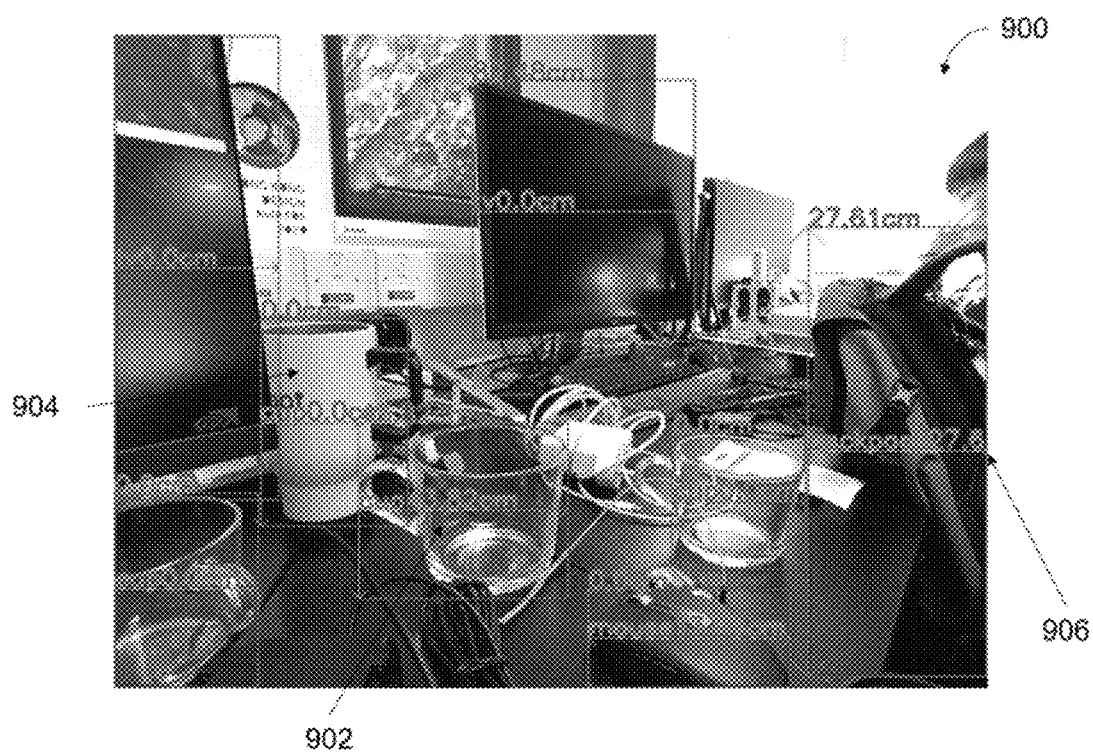
FIG. 9 illustrates an image processed with an object detection method that uses only a 2D image and 2D object detection.
Figure 10:
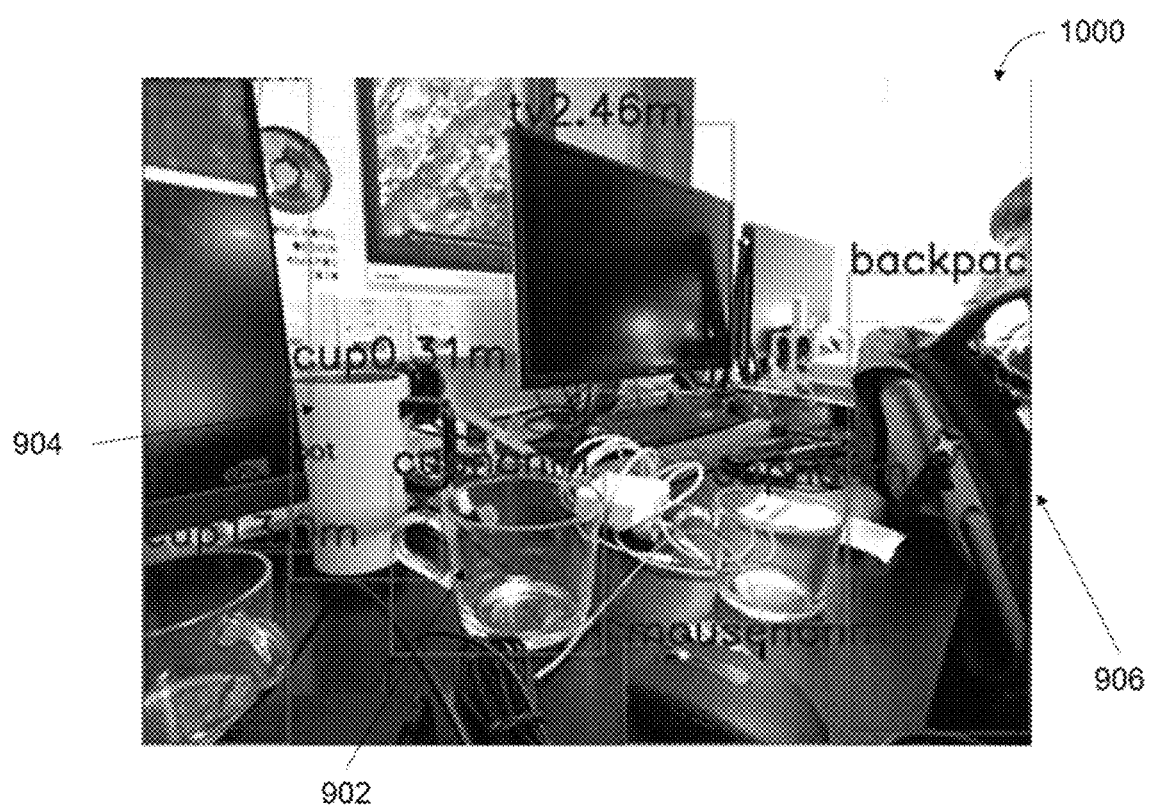
FIG. 10 illustrates an image processed with the object detection method of FIG. 3 or FIG. 4.

FIG. 9 illustrates an object detection process that is applied to a scene. The object detection applied to FIG. 900 only processes the 2D image and does not use any depth data. As shown in FIG. 9, the object identification and classification are not accurate. The 2D object detection applied results in larger errors in particular outlining of each object leaks outside the actual object. As shown in FIG. 9 objects 902, 904, 906 are incorrectly identified. The outline around the cup 902 leaks outside the actual object. Further backpack 906 outline is larger than the actual backpack. The glass 904 is classified as a cup also overlaps with the cup 902. Similarly, there are other errors in image 900. FIG. 10 illustrates an image 1000 that shows the output of the object detection method 300, 400 as applied to the image 1000. FIG. 10 illustrates an output of the object detection method when performed by the object detection system 100. A scene is illustrated in image 1000. The scene includes multiple objects. Various objects in the image 1000 are identified and classified by applying the object detection method 300, 400. Each object is outlined around each detected object. The depth of each identified object is also displayed on the image. The depth perception is used to further identify and differentiate between various objects.

As shown in FIG. 10, when depth data is used in identification and classification the outline of each object does not leak into other objects. The bounding box is smaller and more accurate since the depth data is used to distinguish objects depending on the depth and relative position of the objects. Using depth data provides a more accurate identification and classification of objects.

The numbers in FIG. 1000 indicate the distance each identified object is from the position scanner. Each identified object is also classified. As shown in FIG. 1000 the various objects are classified e.g., backpack or cup or mouse etc. FIG. 10 shows the identified and classified objects when depth perception is used to further distinguish objects as compared to image 900. As shown in FIG. 10, the glass 904 and cup 902 are distinguished and correctly identified. The backpack 906 is also more accurately identified.

The object detection system 100 and the object detection method 300, 400 provides a more accurate way to identify and classify objects in a scene. The object detection system and object detection method as described herein are more accurate since depth data is used to differentiate between various objects in a scene based on the relative position of the objects. Depth data provides additional context that is used for improved object detection. The additional context using depth data improves performance of object detection. This is particularly necessary in aquatic environments of marine environments. The extra perspective from the depth information from LIDAR and stereo image data makes the object detection method as described herein very useful for object identification and classification on noisy scenes e.g., aquatic environments.

Although not required, the examples described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components, and data files assisting in the performance of particular functions, the skilled person will understand that the functionality of the software application may be distributed across a number of routines, objects, or components to achieve the same functionality desired herein. It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" and "controller" are used, these terms are intended to cover any appropriate arrangement of computer hardware capable of implementing the function described.

It will be appreciated by persons skilled in the art that numerous variations and/or modifications may be made to the invention as shown in the specific examples without departing from the spirit or scope of the invention as broadly described. The present examples are, therefore, to be considered in all respects as illustrative and not restrictive. Any reference to prior art contained herein is not to be taken as an admission that the information is common general knowledge, unless otherwise indicated.

The phrases 'computer-readable medium' or 'machine-readable medium' as used in this specification and claims should be taken to include, unless the context suggests otherwise, a single medium or multiple media. Examples of multiple media include a centralised or distributed database and/or associated caches. These multiple media store the one or more sets of computer executable instructions. The phrases 'computer-readable medium' or 'machine-readable medium' should also be taken to include any medium that is capable of storing, encoding, or carrying a set of instructions for execution by a processor of a computing device and that cause the processor to perform any one or more of the methods described herein. The computer-readable medium is also capable of storing, encoding or carrying data structures used by or associated with these sets of instructions. The phrases 'computer-readable medium' and 'machine readable medium' include, but are not limited to, portable to fixed storage devices, solid-state memories, optical media or optical storage devices, magnetic media, and/or various other mediums capable of storing, containing or carrying instruction(s) and/or data. The 'computer-readable medium' or 'machine-readable medium' may be non-transitory.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function. Certain processes or methods may have sub-processes in the form of sub routines that are executed. The steps of sub-routines may be executed sequentially or in parallel. The sub-routine is exited once the steps are executed. Optionally, processes or sub-processes (i.e., sub routines) may be interrupted or repeated as needed.

Aspects of the systems and methods described above may be operable or implemented on any type of specific-purpose or special computer, or any machine or computer or server or electronic device with a microprocessor, processor, microcontroller, programmable controller, or the like, or a cloud-based platform or other network of processors and/or servers, whether local or remote, or any combination of such devices.

Furthermore, examples may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the above description, a storage medium may represent one or more devices for storing data, including read-only memory (ROM), random access memory (RAM), magnetic disk storage mediums, optical storage mediums, flash memory devices and/or other machine or computer readable mediums for storing information.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the scope of the invention. Additional elements or components may also be added without departing from the scope of the invention. Additionally, the features described herein may be implemented in software, hardware, as a business method, and/or combination thereof.

In its various aspects, examples of the invention can be embodied in a computer-implemented process, a machine (such as an electronic device, or a general-purpose computer or other device that provides a platform on which computer programs can be executed), processes performed by these machines, or an article of manufacture.

The invention claimed is:

1. An object detection system for detecting one or more objects in an aquatic environment, the system comprising:
   a first image capture device
   a second image capture device
   a position scanner
   a controller in electronic communication with the first image capture device, the second image capture device and the position scanner,
   the controller configured to:
      receive a 2D image of a scene including the one or more objects,
      receive or resolve a stereo image of the scene,
      receive position information of the one or more objects in the scene,
      determine a depth data of the one or more objects in the scene based on the position information,
      detect one or more objects in the scene based on the 2D image, the stereo image, and the depth data of the one or more objects;
   wherein the position information comprises point cloud data that defines position of each object in a 3D dimensional coordinate system and the controller is configured to calculate depth data based on the coordinates of each object in the point cloud;
   wherein the controller is further configured to: generate a 3D reconstruction of the scene based on the depth information from the position scanner and the depth from the stereo image, and the output of the object detection of the stereo image; and wherein the controller is configured to generate the 3D reconstruction of the scene is generated by plotting the stereo image onto the point cloud data to identify the positions of the detected objects in the stereo images in three dimensions.

2. The object detection system in accordance with claim 1, wherein the controller is further configured to: identify and classify objects is based on combining the 2D image, the stereo image, and the depth data of the one or more objects to distinguish objects in a foreground from objects in a background.

3. The object detection system in accordance with claim 1, wherein the first image detection device comprises a RGB camera, and the second image detection comprises an RGB camera or a stereo camera.

4. The object detection system in accordance with claim 1, wherein the position scanner comprises a transmitter and receiver,
the transmitter and receiver arranged in electrical communication with the controller,
the controller configured to:
control the transmitter to transmit a measurement signal at set time intervals or continuously,
receive reflected signals from the receiver, wherein the reflected signals are representative of the position information,
determine the depth data based on the time of flight of the reflected signal.

5. The object detection system in accordance with claim 1, wherein the position scanner comprises a LIDAR device.

6. The object detection system in accordance with claim 2, wherein the controller is configured to:
align the 2D Image of the scene with the stereo image the scene;
determine a distance measurement of the one or more objects in the scene based on the stereo image and the depth data of the one or more objects;
identify and classify one or more objects in the scene based on the alignment of the 2D image and the stereo image and the depth data.

7. The object detection system in accordance with claim 2, wherein the controller is configured to: identify one or more objects in the 2D image by applying an object recognition process to the 2D image to generate a 2D reconstruction of the scene with one or more objects being identified within the scene.

8. The object detection system in accordance with claim 7, wherein as part of the object detection of the 2D image, the controller is configured to:
perform image segmentation to segment the 2D image outline each object
identify and classify objects within the 2D image based on a classification data set,
generate a 2D reconstruction of the scene with the identified and classified objects.

9. The object detection system in accordance with claim 7, wherein the controller is configured to implement a mask R-CNN and the controller is configured to perform the object recognition process by the mask R-CNN by utilising the classification data and the controller further configured to perform image instance segmentation using the mask R-CNN.

10. The object detection system in accordance with claim 7, wherein the object recognition process identifies contours of the one or more objects detected in the 2D image.

11. The object detection system in accordance with claim 7, wherein the one or more identified objects are defined by a two-dimensional coordinate and each portion of the one or more identified objects is defined by two dimensional coordinates.

12. The object detection system in accordance with claim 1, wherein the controller is configured to:
perform object recognition on the stereo image,
determine depth of each object identified in the stereo image.

13. The object detection system in accordance with claim 1, wherein the controller is further configured to determine the depth of each object identified in the stereo image by performing triangulation to determine the depth of each object within the stereo image.

14. The object detection system in accordance with claim 1, wherein the position of each detected object or each portion of the detected object is defined by three dimensional coordinates, and the depth of each object is computed from the coordinates.

15. The object detection system in accordance with claim 6, wherein the controller is configured to combine the 2D reconstruction and the 3D reconstruction of the scene to identify and classify objects within the scene.

16. The object detection system in accordance with claim 1, wherein for the step of combining, the controller is configured to:
align the 2D reconstruction and the 3D reconstruction;
adjust contours of the identified objects in the 2D reconstruction with contours of the identified objects in the 3D reconstruction to rectify object identification results,
wherein combining the 2D and 3D reconstructions of the scene results in an improved 3D reconstruction of the scene in which each object is more accurately identified by accounting for difference in depth.

17. The object detection system in accordance with claim 16, wherein the controller is further configured to:
determine an outline about each object detected within the improved 3D reconstruction; and
determine the size of each object detected within the improved 3D reconstruction.

18. The object detection system in accordance with claim 17, wherein the outline of each object is defined by a bounding box and the controller is configured to determine the size of each object based on coordinates of the bounding box.

* * * * *